May 23, 1972     B. WALKER     3,664,653
ENERGY ABSORBER
Filed Dec. 29, 1969
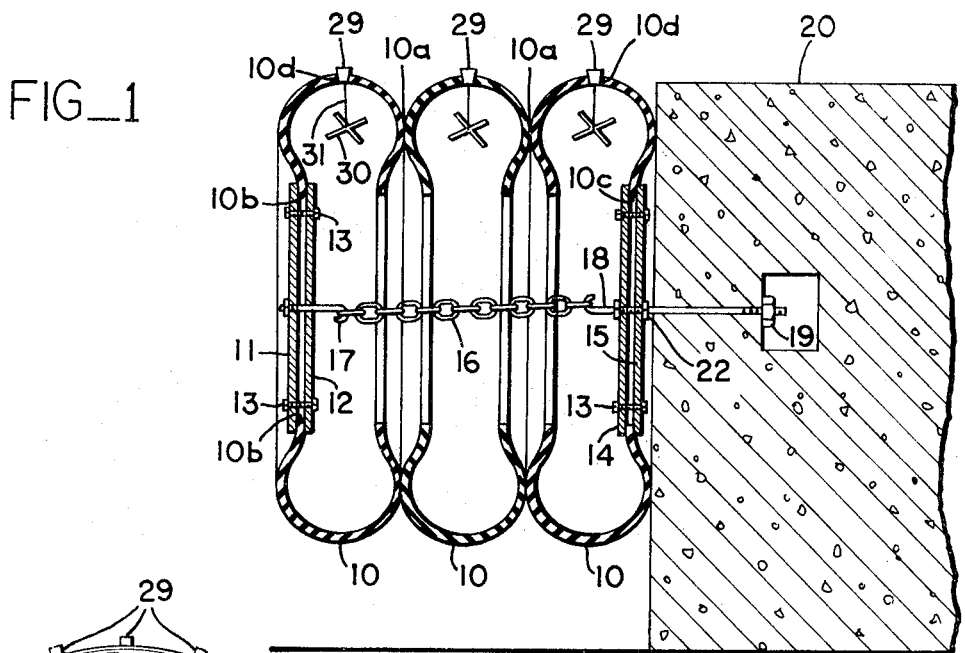
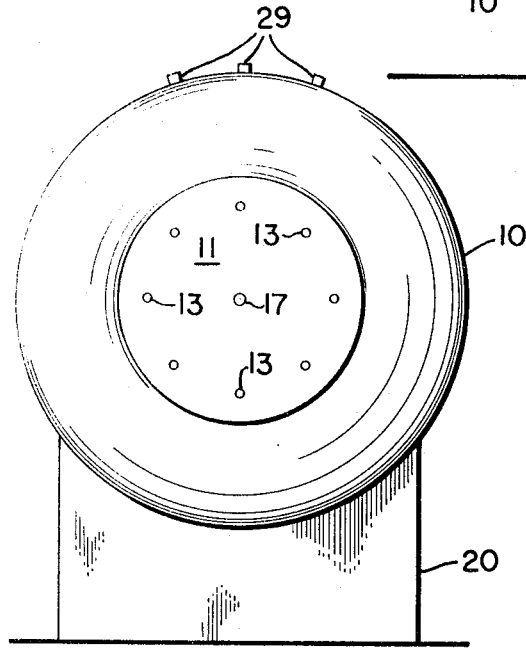
FIG_2
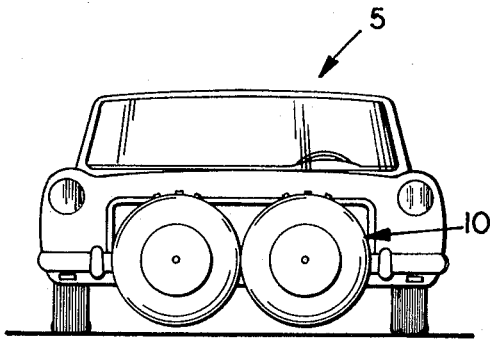
FIG_4
FIG_3
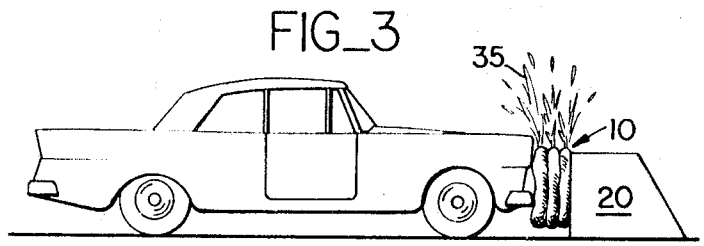
*INVENTOR.*
BROOKS WALKER

3,664,653
ENERGY ABSORBER
Brooks Walker, 1280 Columbus Ave.,
San Francisco, Calif. 94133
Filed Dec. 29, 1969, Ser. No. 888,421
Int. Cl. B60r 19/10; F16f 9/10
U.S. Cl. 267—139        3 Claims

ABSTRACT OF THE DISCLOSURE

This invention pertains to an energy absorber for use on abutments or the front of vehicles to absorb energy when the vehicle abuts against another vehicle or a vehicle abuts against an abutment; the absorber to be joined by one or more tires, filled with a liquid such as water and with one or more blow out plugs to allow the liquid to escape when impacted, the ends or rim sides of the tires to be closed and connected by flexible or collapsible means.

---

An object of the invention is as stated in the above summary.

Another object is to use inexpensive used tires secured together as by cementing the sides togther or vulcanizing them together closing the rim opening at each end of the combination of the tire casings to be liquid tight and cutting one or more holes in the top of the tires, plugging these holes with blow-out plugs, and attaching the combination to an abutment to absorb energy of a vehicle butting the abutment with reduced or no damage to the vehicle and its occupant depending on the mass of the vehicle and the velocity of impact and the energy absorbent quality of the combination.

Another object is to use one or more such tires with collapsible (towards each other) closures for the rim openings on each side of a single tire or on the outside closures of the rim openings on the outside edges of a group of attached tire energy absorbers and attaching such tires to an abutment or to the front of a vehicle for energy absorption.

Another object is to find a good use for tires too worn for car support as very effective energy absorbers in case of an accident.

Other objects will be more particularly pointed out in the accompanying specification and claims.

I have illustrated my invention in the accompanying drawings, in which:

FIG. 1 shows a cross section of one form of the invention taken in a vertical plane through the center of the tire energy absorber.

FIG. 2 shows an elevation view of the same absorber attached to an abutment.

FIG. 3 shows a vehicle butting the same energy absorber and the liquid being ejected.

FIG. 4 shows another absorber attached to the front of a vehicle.

In all figures like numerals of reference refer to corresponding parts.

In FIGS. 1 through 5 I have shown a series of vehicle tires 10 secured to each other at their sidewalls 10a by cement or vulcanizing or other suitable means. The rim opening 10b on one of the tires 10 is closed by 2 discs 11 and 12 which are secured together by bolts 13. Rim opening 10c at the other end of the pile of tires 10 is likewise closed by discs 15 and 14 or other suitable closures.

These discs 11 and 12 at one side are secured to discs 14 and 15 at the other side of the pile of tires 10 by a collapsible tightener such as chain 16 secured to hook bolts 17 and 18. Chain 16 could be a cable or other tie that would not seriously obstruct the collapse of the water filled tires on sufficient impact as by a car running into the abutment 20 to which the combination of tires are suitably attached as by bolts 22 to disc 14. Each tire 10 has one or more holes in the top, such as 10d, closed by a blowout plug 29 which may be attached to a cord 31 and a retainer 30 that does not easily go through holes 10d in tires 10, nor does retainer 30 obstruct seriously the rapid flow of liquid 35 from the holes in tires 10 after a substantial impact. The absorber is attached to abutment 20 by nut 19 on bolt 18.

In FIG. 4 the pile of tires is attached to the front of a vehicle 5. In such a case only one tire may be sufficient considering the overall length limitations. Two or more small diameter tires attached to a back-up bumper may be more durable than tires nearly the same size as those on the vehicle wheels.

In operation, when there is an impact between a vehicle with such an absorber the liquid 35 will be forced out through the openings 10b and the resistance to flow is in proportion to the velocity and velocity is proportional to the square of the pressure, some energy will be absorbed while the tires are deflected to build up pressure in the liquid 35 and more as the liquid 35 is forced out the openings 10b. The greater the force of impact the greater the velocity of liquid ejected from holes 10b and the more absorption per inch of compression.

I have illustrated my invention in these various forms; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

I claim:
1. An energy absorber for positioning on one object to absorb the impact of the latter with another object, including in combination:
   (1) a plurality of wheel tire casings, each casing having side walls and a pair of central circular rim openings, said casings being aligned sufficiently to have their sidewalls in contact and sealed fluid tight to each other;
   (2) substantially fluid-tight closure means for the outer rim openings on the assembled tire casings, which two closure means complete a reservoir bounded by said tire casings and said closure means for containing a liquid therein;
   (3) at least one of said connected tire casings having a vent therein, said vent allowing a restricted flow of liquid from said reservoir upon application of pressure to the outside of said connected tire casings.
2. The energy absorber of claim 1 having collapsible means for limiting the axial expansion of said closure means.
3. The energy absorber of claim 1 wherein each said closure means comprises a pair of discs, and means se- curing each of said pair of discs to a respective outer rim opening of said tire casings.

References Cited

UNITED STATES PATENTS

| 2,413,210 | 12/1946 | Blackman | 114—219 |
| 2,562,957 | 8/1951 | Sipkin et al. | 114—219 |
| 3,404,534 | 10/1968 | Conney | 61—48 |
| 3,512,822 | 5/1970 | Rich et al. | 293—1 |

FOREIGN PATENTS

| 863,300 | 1/1941 | France | 114—219 |

ARTHUR L. LA POINT, Primary Examiner

R. SAIFER, Assistant Examiner

U.S. Cl. X.R.

267—122; 293—1, 71 P; 114—219